United States Patent
Linnenbrügger

(10) Patent No.: US 6,416,433 B1
(45) Date of Patent: Jul. 9, 2002

(54) CHAIN-BELT TRANSMISSION WITH CONTINUOUSLY VARIABLE TRANSMISSION RATIO

(75) Inventor: André Linnenbrügger, Bühl (DE)

(73) Assignee: LuK Lamellen und Kupplungsbau GmbH, Buhl/Baden (DE)

( * ) Notice: Subject to any disclaimer, the term of this patent is extended or adjusted under 35 U.S.C. 154(b) by 0 days.

(21) Appl. No.: 09/535,345

(22) Filed: Mar. 24, 2000

(30) Foreign Application Priority Data

Apr. 19, 1999 (DE) .......................................... 199 17 615

(51) Int. Cl.[7] .............................. F16H 55/56; F16H 5/16
(52) U.S. Cl. .......................... 474/8; 474/242; 474/245
(58) Field of Search ............................ 474/8, 242, 245, 474/18, 15, 17, 201, 214, 215, 240, 16, 21

(56) References Cited

U.S. PATENT DOCUMENTS

| | | | |
|---|---|---|---|
| 3,548,670 A | * 12/1970 | Schnegg et al. | 474/8 |
| 3,572,148 A | * 3/1971 | Hebert | 474/242 |
| 4,631,042 A | * 12/1986 | Rattunde | 474/8 |
| 5,328,412 A | * 7/1994 | Durum | 474/8 |
| 5,792,013 A | * 8/1998 | Heinrich et al. | 474/8 |

FOREIGN PATENT DOCUMENTS

| | | | | |
|---|---|---|---|---|
| CA | 643756 | * | 6/1962 | 474/8 |
| DE | 34 47092 A 1 | | 7/1986 | |
| IT | 574631 | * | 3/1958 | 474/8 |
| JP | 0243559 | * | 10/1988 | 474/8 |
| SU | 1705649 A1 | * | 1/1992 | 474/8 |

* cited by examiner

Primary Examiner—David A. Bucc
Assistant Examiner—Marcus Charles
(74) Attorney, Agent, or Firm—Darby & Darby

(57) ABSTRACT

A chain-belt transmission with a continuously variable transmission ratio has input and output shafts, each carrying a pair of conical disks, with a chain belt running in a loop around the disk pairs and transmitting torque from the input to the output shaft. The friction surfaces of the conical disks and the end surfaces of the force-transfer elements of the chain belt have contour shapes that provide greater resistance to wear and thereby increase the operating life of the transmission.

6 Claims, 2 Drawing Sheets

CHAIN-BELT TRANSMISSION WITH CONTINUOUSLY VARIABLE TRANSMISSION RATIO

BACKGROUND OF THE INVENTION

The invention relates to a continuously variable transmission of the type employing pairs of conical disks and an endless flexible torque-transmitting device (chain-belt, for short).

A transmission of this kind is known, e.g., from DE 3 447 092 A1. In this transmission, the torque is transmitted from one pair of conical disks to the other by means of a chain of steel links with force-transfer elements arranged transverse to the lengthwise direction of the chain. The end surfaces of the force-transfer elements are in frictional engagement with the friction surfaces that face each other in each of the pairs of conical disks. Both the end surfaces of the force-transfer elements and the friction surfaces of the pairs of conical disks are of a convex, rounded shape. The convex curvature radii are selected in such a way that overall, the different portions of the end surfaces of the force-transfer elements that come into frictional contact with the friction surfaces at different transmission ratios are distributed essentially over the entire end surface, so that the end surface material is used optimally and the chain-belt transmission has a long work life.

It is in the nature of chain-belt transmissions, particularly those used in motor vehicles, that over the entire operating life, the amounts of time spent in different parts of the range of transmission ratios are unequal. For example, the chain-belt transmissions of vehicles that are not exclusively used in city traffic are operated at the highest ratio for an over-proportionate amount of the time, i.e., with the pair of disks on the input side of the transmission running at their closest distance and the pair of disks on the output side running at their widest distance, in order run the vehicle as economically as possible. Therein lies the danger that the driven pair of disks in particular could become worn, even leading to the formation of grooves. The formation of grooves or ruts in the friction surfaces of a pair of conical disks has the effect that very small changes of the distance between the disks lead to big changes of the transmission ratio. This results in instabilities in ratio-shifting and/or makes it impossible to down-shift, i.e., to move the chain-belt towards an area of greater radius on the rutted pair of conical disks.

Also, instabilities in the gripping-force ratio occur for example after a transmission has been in operation for a long time, which requires a corresponding compensation adjustment to be made by the control unit through the control or regulation of the compressive force and the axial displacement of the pairs of conical disks. The gripping-force ratio in this context is the ratio between the respective amounts of axial force at the two pairs of conical disks. Particularly critical are conditions where the gripping-force ratio has a steep gradient in relation to the transmission ratio. This can lead to problems with the control and regulation and to oscillations of the transmission ratio, if the gripping-force ratio changes over the operating life of the transmission. To keep the transmission ratio constant, it is advantageous if the gripping force ratio is stable within a given range.

OBJECT OF THE INVENTION

The object of the present invention is to further develop a chain-belt transmission of the kind discussed above with the aim of improving its long-term functionality and assuring stable regulation and control properties to the greatest extent possible in all operating states.

SUMMARY OF THE INVENTION

A continuously variable chain-belt transmission meeting the aforementioned objective has an input shaft and an output shaft running parallel at a distance from each other. The input and output shaft each carry a pair of conical disks rotationally constrained on the respective shaft, while the axial width between the conical disks of each pair is variable so that an increase in the width of one pair is tied to a decrease in the other and vice versa. An endless flexible torque-transmitting device (which will subsequently be referred to as a chain belt) loops around the essentially cone-shaped friction surfaces of the conical disks. Transverse members (subsequently called force-transfer elements) arranged along the chain belt have end surfaces in frictional contact with the friction surfaces of the pairs of conical disks, thereby enabling the chain belt to transmit torque from the input shaft to the output shaft. The continuously variable transmission according to the invention is advantageously distinguished in that the friction surfaces of at least one of the pairs of conical disks have at least one diameter zone where the contour of the friction surface deviates from a uniform contour shape.

Preferred as a uniform contour shape (in a sectional view) is either a straight-line contour or a circular segment of a given radius.

It is practical if the deviating contour is distinguished by having a portion of greater or lesser material depth that could be formed by laying on or removing material.

It is further advantageous if the friction surfaces of at least the pair of disks on the output shaft have a convex curvature with respect to the radial direction, with a greater curvature radius R in the area of smaller radial distances from the shaft.

It is also of practical advantage if the friction surfaces have radially inner ring-shaped border zones of constant slope angle $\alpha 1$.

It is of benefit if the friction surfaces of at least the disk pair of the input shaft and/or of the output shaft have, in order of decreasing radius, a zone of constant slope angle continuing through a concave zone into a convex zone with regard to the depth of material.

It is also of practical benefit if the end surfaces of the force-transfer elements are convex-rounded towards the friction surfaces of the conical disks, with the radius of the convex curvature increasing from r1 to r2 with increasing radial distance from the shaft.

A further configuration of the continuously variable chain-belt transmission has a) an input shaft and an output shaft running parallel at a distance from each other, the input and output shaft each carrying a pair of conical disks rotationally constrained on the respective shaft, while the axial width between the conical disks of each pair is variable so that an increase in the width of one pair is tied to a decrease in the other and vice versa;

b) a chain belt looping around the essentially cone-shaped friction surfaces of the conical disks, with transverse force-transfer elements arranged along the chain belt, the force-transfer elements having end surfaces in frictional contact with the friction surfaces of the pairs of conical disks, thereby enabling the chain belt to transmit torque from the input shaft to the output shaft;

and is distinguished by the advantageous feature that the friction surfaces of at least one of the pairs of conical disks have a contour which, as a function of radial distance from the shaft, deviates from a straight-line or a circular segment-shaped contour.

The novel features that are considered as characteristic of the invention are set forth in particular in the appended claims. The improved apparatus itself, however, both in its construction and its mode of operation, together with additional features and advantages thereof, will be best understood upon perusal of the following detailed description of certain presently preferred specific embodiments with reference to the accompanying drawing.

BRIEF DESCRIPTION OF THE DRAWING

The invention is explained below through examples illustrated in schematic drawings and with further details, where.

DETAILED DESCRIPTION OF THE INVENTION

Figure 1:
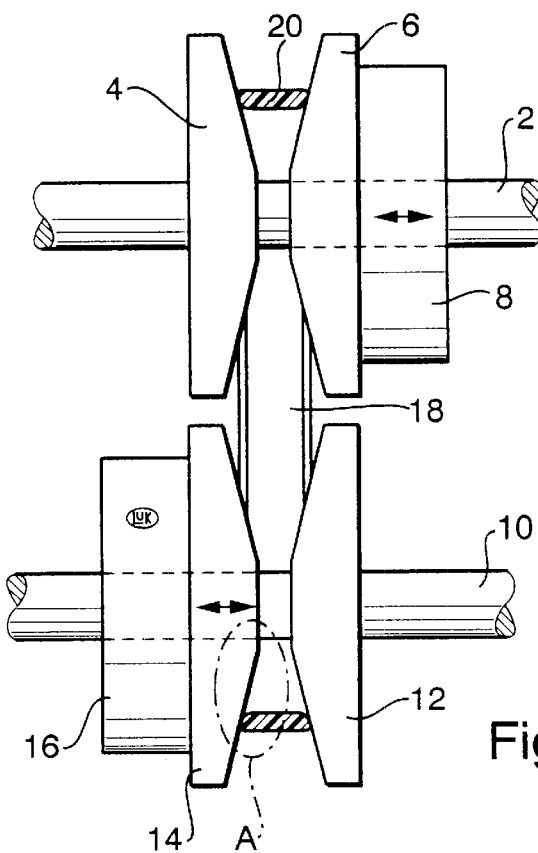
FIG. 1 illustrates the principle of a continuously variable chain-belt transmission with pairs of conical disks.

According to FIG. 1, a pair of conical disks 4, 6 is arranged on an input shaft 2. The conical disk 4 has a fixed connection to a first shaft 2, e.g., an input shaft. The conical disk 6, while being rotationally constrained on the shaft 2, is axially movable along the latter by means of at least one, but preferably two hydraulic cylinders 8.

Similarly, a pair of conical disks 12, 14 and a hydraulic cylinder 16 are arranged on a second shaft 10, e.g., an output shaft, that runs parallel to the first shaft 2. Torque is transmitted by an endless flexible torque-transmitting device 18, e.g., a chain belt with force-transfer elements 20 distributed over the length of the chain belt and running parallel to the axes of the shafts. The force-transfer elements terminate on both sides in end surfaces 24 that are in frictional engagement with the cone-shaped friction surfaces of the conical disk. The functional principle of a chain-belt transmission with conical disks is known per se and, therefore, requires no further explanation.

Each of the FIGS. 2 to 5 represents the portion A of FIG. 1 drawn to an enlarged scale.

Figure 2:
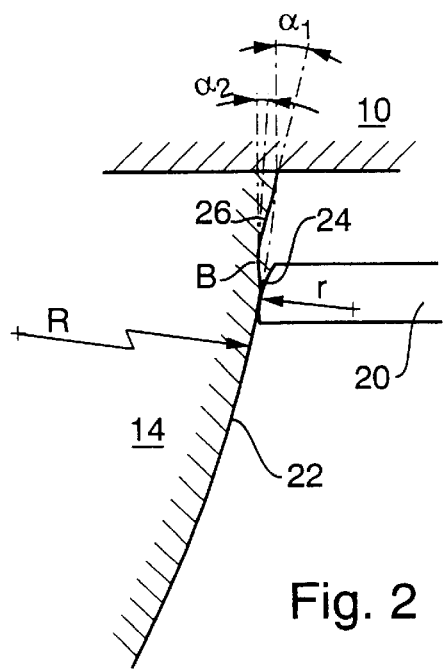
FIGS. 2 to 5 represent enlarged detail views of the portion A of FIG. 1.

According to FIG. 2, the friction surface 22 of the conical disk 14 is not flat but rather of convex, rounded shape with a curvature radius R. Likewise, the end surface 24 is not planar, but of a convex, rounded shape with a curvature radius r. The respective convexities and slope angles of the friction surface 22 and end surface 24 are coordinated so that the contact area between the friction surface 22 and end surface 24 moves lower on the end surface 24 (in the representation of FIG. 2) when the force-transfer element 20 moves closer to the output shaft 10, i.e., in the case where the transmission shifts up into a high transmission ratio.

Typically, the transmission of a vehicle is operated at the highest transmission ratio (corresponding to the minimum distance of the force-transfer element 20 from the output shaft 10) during an over-proportionately long part of the time, on the one hand to conserve fuel and on the other hand to drive at high speed. Transmissions can have overdrive ratios that are even higher than the ratio at which the vehicle achieves its top speed. As an overall result of these factors, an increased amount of wear can occur in the zone of the friction surface 22 that corresponds to high transmission ratios and, consequently, the contour of the friction surface 22 will lose its intended shape (dash-dotted line) and become indented in the area 26. The indented area 26 can thus be thought of as a depression formed along the friction surface 22.

The angle $\alpha 1$ represents the slope of the friction surface 22 at its base B in the intended condition (dash-dotted line), while $\alpha 2$ represents the slope angle at the same location B for a worn-out condition of the friction surface 22. As shown in the drawing, the friction surface in the worn-out condition runs approximately perpendicular to the axis of the output shaft. In extreme cases, the amount of wear can reach the point where the friction surface 22 in the area 26 runs at a right angle to the output shaft 10, or even at a receding angle, i.e., sloping to the left of the vertical in FIG. 2. This condition has the consequence that the transmission can no longer be precisely controlled in the high range and that it can even cease to function because it becomes impossible to shift from the top ratio to a lower ratio.

Figure 3:
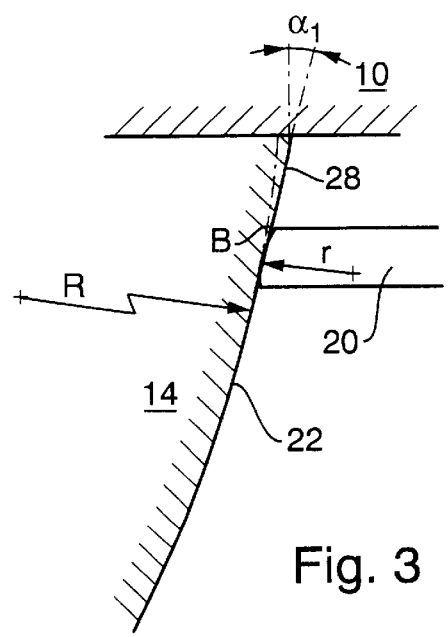

FIG. 3 represents a contour line of a conical disk according to the invention. The geometry corresponds to FIG. 2, except that the curvature radius R of the friction surface 22 is increased in a selected area of the conical disk. In the illustrated example, the increased curvature radius R is in the radially innermost zone of the conical disk 14, i.e., in the area closest to the output shaft 10. The curvature radius R in the illustrated example of FIG. 3 is infinitely large, i.e., the radially inner portion of friction surface 22 of the conical disk 14 has the shape of a shallow cone with a constant slope angle $\alpha 1$. Thus, in comparison to the original design (constant curvature radius R; dash-dotted line), the radially innermost zone of the friction surface 22 is built up by an additional amount of material. The added material can now be worn away without harming the functionality of the transmission. The added thickness or build-up of material can range from zero at the location B to 0.5 mm at the extreme location that the frictional engagement between the force-transfer element 20 and the conical disk 14 will reach at the highest possible transmission ratio.

The additional amount of axial displacement required at the high end of the transmission range because of the added material build-up 28 can be compensated by a correspondingly steeper contour slope of the friction surface in the lower part of the transmission range, i.e., in the radially outer part of the conical disk 14.

It is of advantage if the contour of the conical disk deviates from a straight line or from a simple rounded shape of radius R in such a way that it can be mathematically described through a simple n-th order polynomial. This makes it possible to achieve a contour that deviates from a uniform curvature in at least one radial zone. The deviation can be realized, e.g., by a build-up of material or by a transition from a finite curvature to a straight line.

Figure 4:
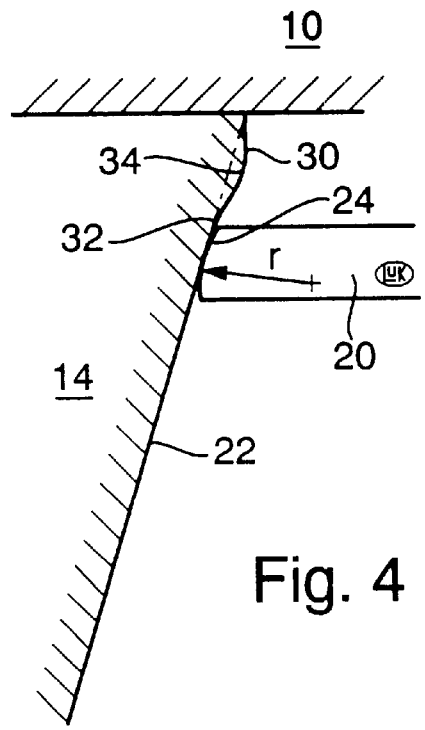

FIG. 4 shows an embodiment where the friction surface 22 of the conical disk 14 is sloped at a constant angle, i.e., not convex-curved. The end surface 24 of the force-transfer element 20 is again configured with a curvature radius r, i.e., with a rounded shape. In the case of this embodiment, to avoid wear damage to the friction surface 22 in the zone of high transmission ratios, the friction surface 22 is provided with an added material build-up 30 in the area corresponding to high transmission ratios, i.e., in the innermost radial zone, so that the inner part of the friction surface 22, in order of decreasing radius comprises a concave zone 32 transitioning into a convex zone 34. As is immediately evident, the material build-up 30 can become worn down without harmful consequences, as the friction surface 22 will take on its straight-line contour (dash-dotted line) only after the material build-up 30 has been worn down. It goes without saying that the rounded shape of the end surface 24 is matched to the material build-up 30, so that at any transmission ratio an interior area, not the edge, of end surface 24 makes contact with the contoured friction surface 22. The material build-up 30 can thus be thought of as an elevated section relative to the friction surface 22.

It is to be understood that the conical disk 14 according to FIGS. 3 and 4 can be machined to the desired contour during the manufacturing process and that the areas 28 and 30 are not created in a separate process of adding material to the surface. It is advantageous to provide the deviating contour shape on the conical disks of the first and/or second shaft.

Figure 5:
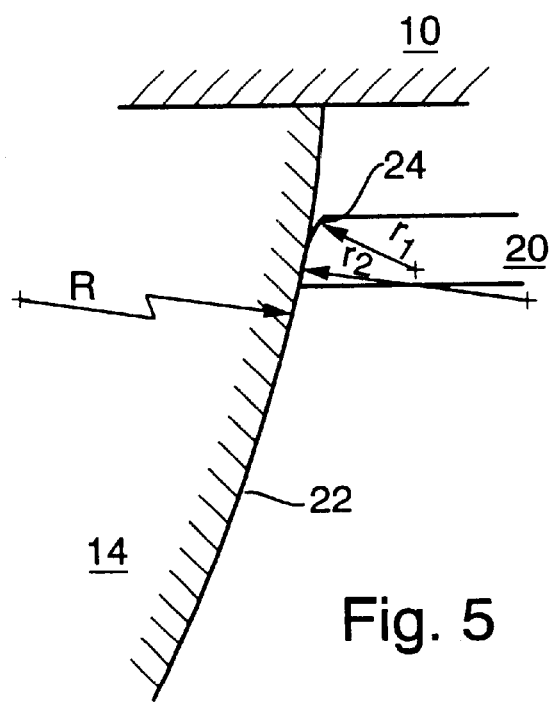

FIG. 5 illustrates a further modified embodiment. The conical disk 14 has a rounded shape with a radius R. The end surface 24 of the force-transfer element 20, likewise, is given a rounded shape with a smaller radius r1 in the upper area (in relation to FIG. 5) that is nearer the output shaft and a comparatively larger radius r2 in the area farther from the output shaft. This embodiment, which could be called the reverse of the embodiment according to FIG. 3, corresponds to overlaying the end surface 24 with additional material in the area of the large curvature radii, offering the advantage that in the case of high transmission ratios (where the friction surface is engaged with the portion of the end surface 24 that has the large curvature radius r2), the surface stress is reduced, whereby the wear resistance of the radially inner zone and thus the useful life of the conical disk 14, too, is increased.

It should be understood that the measures described above can individually or in different combinations be applied to the conical disk pairs 4, 6 and 12, 14 as well as the force-transfer elements 20 in order to improve the long-term durability of the transmission. It is further understood that the friction surfaces of a pair of conical disks are always designed symmetrically, i.e., provided equally with the same measures. The invention is applicable to all zones of the friction surfaces and all portions of the end surfaces that are endangered by an increased amount of wear under the particular operating conditions that the transmission is subjected to.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art and, therefore, such adaptations should and are intended to be comprehended within the meaning and range of equivalence of the appended claims.

What is claimed is:

1. A continuously variable chain-belt transmission including:
   a) an input shaft and an output shaft running parallel at a distance from each other, the input and output shaft each carrying a pair of conical disks rotationally constrained on the respective shaft, the conical disks of each pair having a variable axial distance that is controlled so that an increase in the distance of one pair is tied to a decrease in the other and vice versa;
   b) a chain belt looping around friction surfaces of the conical disks with transverse force-transfer elements arranged along the chain belt, the friction surfaces having substantially cone-shaped contours and the force-transfer elements having end surfaces in frictional contact with the friction surfaces of the pairs of conical disks, thereby enabling the chain belt to transmit torque from the input shaft to the output shaft; and
   wherein the friction surfaces of at least one of the pairs of conical disks have at least one zone with a surface profile deviating from the substantially cone-shaped contour and, wherein the surface profile of the zone has a shape belonging to the group consisting of elevations and depressions.

2. A continuously variable chain-belt transmission with
   a) an input shaft and an output shaft running parallel at a distance from each other, the input and output shaft each carrying a pair of conical disks rotationally constrained on the respective shaft, the conical disks of each pair having a variable axial distance that is controlled so that an increase in the distance of one pair is tied to a decrease in the other and vice versa;
   b) a chain belt looping around friction surfaces of the conical disks with transverse force-transfer elements arranged along the chain belt, the friction surfaces having substantially cone-shaped contours and the force-transfer elements having end surfaces in frictional contact with the friction surfaces of the pairs of conical disks, thereby enabling the chain belt to transmit torque from the input shaft to the output shaft; and
   wherein the friction surfaces of at least one of the pairs of conical disks have at least one zone with a surface profile deviating from the substantially cone-shaped contour, wherein friction surfaces of at least one pair of disks have convex contours facing each other, the convex contours having an increased curvature radius R towards radially inner zones of the disks.

3. A continuously variable chain-belt transmission with
   a) an input shaft and an output shaft running parallel at a distance from each other, the input and output shaft each carrying a pair of conical disks rotationally constrained on the respective shaft, the conical disks of each pair having a variable axial distance that is controlled so that an increase in the distance of one pair is tied to a decrease in the other and vice versa;
   b) a chain belt looping around friction surfaces of the conical disks with transverse force-transfer elements arranged along the chain belt, the friction surfaces having substantially cone-shaped contours and the force-transfer elements having end surfaces in frictional contact with the friction surfaces of the pairs of conical disks, thereby enabling the chain belt to transmit torque from the input shaft to the output shaft; and
   wherein the friction surfaces of at least one of the pairs of conical disks have at least one zone with a surface profile deviating from the substantially cone-shaped contour, wherein the substantially cone-shaped contour has an annular cross-section of constant curvature radius R, wherein the friction surfaces of at least one pair of disks end in radially inner ring-shaped border zones that have a constant slope angle.

4. A continuously variable chain-belt transmission with
   a) an input shaft and an output shaft running parallel at a distance from each other, the input and output shaft each carrying a pair of conical disks rotationally constrained on the respective shaft, the conical disks of each pair having a variable axial distance that is controlled so that an increase in the distance of one pair is tied to a decrease in the other and vice versa,
   b) a chain belt looping around friction surfaces of the conical disks with transverse force-transfer elements arranged along the chain belt, the friction surfaces having substantially cone-shaped contours and the force-transfer elements having end surfaces in frictional contact with the friction surfaces of the pairs of conical disks, thereby enabling the chain belt to transmit torque from the input shaft to the output shaft; and wherein the friction surfaces of at least one of the pairs of conical disks have at least one zone with a surface profile deviating from the substantially cone-shaped contour, wherein the friction surfaces of at least one pair of disks have, in order of decreasing radial distance from the shaft, a zone of constant angle continuing through a concave zone into a convex zone.

5. A continuously variable chain-belt transmission with a) an input shaft and an output shaft running parallel at a distance from each other, the input and output shaft each carrying a pair of conical disks rotationally constrained on the respective shaft, the conical disks of each pair having a variable axial distance that is controlled so that an increase in the distance of one pair is tied to a decrease in the other and vice versa;

b) a chain belt looping around friction surfaces of the conical disks with transverse force-transfer elements arranged along the chain belt, the friction surfaces having substantially cone-shaped contours and the force-transfer elements having end surfaces in frictional contact with the friction surfaces of the pairs of conical disks, thereby enabling the chain belt to transmit torque from the input shaft to the output shaft; and wherein the friction surfaces of at least one of the pairs of conical disks have at least one zone with a surface profile deviating from the substantially cone-shaped contour, wherein the end surfaces of the force-transfer elements are convex-rounded towards the friction surfaces, the end surfaces having a variable curvature radius r that increases from r1 to r2 with increasing radial distance from the shaft.

6. A continuously variable chain-belt transmission with a) an input shaft and an output shaft running parallel at a distance from each other, the input and output shaft each carrying a pair of conical disks rotationally constrained on the respective shaft, the conical disks of each pair having a variable axial distance that is controlled so that an increase in the distance of one pair is tied to a decrease in the other and vice versa;

b) a chain belt looping around essentially cone-shaped friction surfaces of the conical disks, with transverse force-transfer elements arranged along the chain belt, the force-transfer elements having end surfaces in frictional contact with the friction surfaces of the pairs of conical disks, thereby enabling the chain belt to transmit torque from the input shaft to the output shaft; and wherein the friction surfaces of at least one of the pairs of conical disks have a surface profile including a first zone and a second zone, the first zone having a constant surface profile that has at least one of a constant slope and a constant curvature radius r and the second zone has a surface profile that deviates from the constant surface profile.

* * * * *